United States Patent
Devers

(10) Patent No.: US 11,779,908 B2
(45) Date of Patent: Oct. 10, 2023

(54) METHOD FOR REJUVENATING A CATALYST OF A HYDROPROCESSING AND/OR HYDROCRACKING PROCESS

(71) Applicant: IFP Energies nouvelles, Rueil-Malmaison (FR)

(72) Inventor: Elodie Devers, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 259 days.

(21) Appl. No.: 17/414,209

(22) PCT Filed: Dec. 10, 2019

(86) PCT No.: PCT/EP2019/084441
§ 371 (c)(1),
(2) Date: Jun. 15, 2021

(87) PCT Pub. No.: WO2020/126680
PCT Pub. Date: Jun. 25, 2020

(65) Prior Publication Data
US 2022/0062874 A1    Mar. 3, 2022

(30) Foreign Application Priority Data
Dec. 18, 2018 (FR) ........................ 1873234

(51) Int. Cl.
| | | |
|---|---|---|
| *B01J 27/28* | (2006.01) | |
| *B01J 21/04* | (2006.01) | |
| *B01J 27/19* | (2006.01) | |
| *B01J 38/02* | (2006.01) | |
| *B01J 38/12* | (2006.01) | |
| *B01J 38/62* | (2006.01) | |
| *C10G 45/08* | (2006.01) | |
| *C10G 47/12* | (2006.01) | |

(52) U.S. Cl.
CPC .............. *B01J 27/285* (2013.01); *B01J 21/04* (2013.01); *B01J 27/19* (2013.01); *B01J 38/02* (2013.01); *B01J 38/12* (2013.01); *B01J 38/62* (2013.01); *C10G 45/08* (2013.01); *C10G 47/12* (2013.01); *C10G 2300/1059* (2013.01); *C10G 2300/202* (2013.01); *C10G 2300/706* (2013.01); *C10G 2400/02* (2013.01)

(58) Field of Classification Search
CPC .................... C10G 45/08; C10G 65/12; C10G 2300/1088; C10G 2300/202; C10G 2300/207; C10G 2300/4018; C10G 2300/4081; C10G 2300/701; C10G 65/04; B01J 21/04; B01J 23/882; B01J 35/1014; B01J 35/1019; B01J 38/12; B01J 37/20
See application file for complete search history.

(56) References Cited

U.S. PATENT DOCUMENTS

| | | | |
|---|---|---|---|
| 10,464,054 B2 | 11/2019 | Carrette | |
| 2009/0258779 A1* | 10/2009 | McCarthy | .............. C10G 45/10 502/24 |

FOREIGN PATENT DOCUMENTS

| | | | |
|---|---|---|---|
| DE | 10350476 A1 | 5/2005 | |
| FR | 3035600 A1 | 11/2016 | |
| WO | WO-2007084471 A1 * | 7/2007 | .............. B01J 21/08 |

OTHER PUBLICATIONS https://2012books.lardbucket.org/books/principles-of-general-chemistry-v1.0/s31-appendix-c-dissociation-consta.html Schmitz (Year: 2012).*
International Search Report for PCT/EP2019/084441 dated Feb. 11, 2020.
Database WPI XP002795240, CN102463127A, Publication Date: May 23, 2012.
N.N. "3-Mercaptopropanoic acid," Oct. 24, 2019, XP055635812.
English Abstract for DE-10350476, Publication Date: May 25, 2005.

* cited by examiner

*Primary Examiner* — Randy Boyer
*Assistant Examiner* — Juan C Valencia
(74) *Attorney, Agent, or Firm* — MILLEN WHITE ZELANO & BRANIGAN, PC; Brion P. Heaney

(57) ABSTRACT

The invention concerns a method for rejuvenating an at least partially used catalyst originating from a hydroprocessing and/or hydrocracking process, the at least partially used catalyst being derived from a fresh catalyst comprising at least one group VIII metal (in particular, Co), at least one group VIB metal (in particular, Mo), an oxide support, and optionally phosphorus, the method comprising the steps: •a) regenerating the at least partially used catalyst in a gas stream containing oxygen at a temperature between 300° C. and 550° C. so as to obtain a regenerated catalyst, •b) then placing the regenerated catalyst in contact with phosphoric acid and an organic acid, each having acidity constant pKa greater than 1.5, •c) performing a drying step at a temperature less than 200° C. without subsequently calcining it, so as to obtain a rejuvenated catalyst.

17 Claims, No Drawings

US 11,779,908 B2

METHOD FOR REJUVENATING A CATALYST OF A HYDROPROCESSING AND/OR HYDROCRACKING PROCESS

FIELD OF THE INVENTION

The invention relates to a process for the rejuvenation of a hydrotreating and/or hydrocracking catalyst and to the use of the rejuvenated catalyst in the field of hydrotreating and/or hydrocracking.

STATE OF THE ART

Usually, a catalyst for the hydrotreating of hydrocarbon cuts has the aim of removing the sulfur-based or nitrogen-based compounds contained in them in order, for example, to make a petroleum product meet the required specifications (sulfur content, aromatics content, and the like) for a given application (motor vehicle fuel, gasoline or gas oil, domestic fuel oil, jet fuel).

Conventional hydrotreating catalysts generally comprise an oxide support and an active phase based on metals from groups VIb and VIII in their oxide forms and also phosphorus. The preparation of these catalysts generally comprises a stage of impregnation of the metals and the phosphorus on the support, followed by a drying operation and a calcination making it possible to obtain the active phase in their oxide forms. Before their use in a hydrotreating and/or hydrocracking reaction, these catalysts are generally subjected to a sulfidation in order to form the active entity.

The addition of an organic compound to hydrotreating catalysts in order to improve their activity has been recommended by a person skilled in the art, in particular for catalysts which have been prepared by impregnation followed by a drying operation without subsequent calcination. These catalysts are often referred to as "additive-containing dried catalysts".

During its operation in a hydrotreating and/or hydrocracking process, the catalyst becomes deactivated by accumulation of coke and/or sulfur-based compounds or compounds containing other heteroelements at the surface of the catalyst. Beyond a certain period, its replacement is thus necessary.

In order to combat these disadvantages, the regeneration (gentle calcination) of catalysts for the hydrotreating of middle distillates or of spent residues is an economically and ecologically advantageous process because it makes it possible to use these catalysts again in industrial units rather than to landfill them or to recycle them (recovery of the metals). However, the regenerated catalysts are generally less active than the starting catalysts.

In order to overcome the shortfall in hydrodesulfurizing activity of the regenerated catalyst, it is possible to apply an additional "rejuvenation" treatment. The rejuvenation process consists in reimpregnating the regenerated catalyst with a solution containing metal precursors in the presence or absence of organic or inorganic additives. These "rejuvenation" processes are well known to a person skilled in the art in the field of middle distillates. Many patents, such as, for example, U.S. Pat. Nos. 7,906,447, 8,722,558, 7,956,000, 7,820,579, FR 2 972 648, US2017/036202 or also CN102463127, thus provide different methods for carrying out the rejuvenation of the catalysts for the hydrotreating of middle distillates.

The document U.S. Pat. No. 7,956,000 in particular describes a rejuvenation process which brings a catalyst comprising an oxide of metal from group VIb and an oxide of metal from group VIII into contact with an acid and an organic additive which has a boiling point of which is between 80° C. and 500° C. and a solubility in water of at least 5 grams per liter (20° C., atmospheric pressure), optionally followed by a drying operation under conditions such that at least 50% of the additive is maintained in the catalyst. The hydrotreating catalyst can be a fresh hydrotreating catalyst or a spent hydrotreating catalyst which has been regenerated.

The objective of the present invention is thus to provide a process for the rejuvenation of a hydrotreating and/or hydrocracking catalyst making it possible to regain a sufficient catalytic activity.

Subject Matters of the Invention

The invention relates to a process for the rejuvenation of an at least partially spent catalyst resulting from a hydrotreating and/or hydrocracking process, said at least partially spent catalyst resulting from a fresh catalyst comprising at least one metal from group VIII, at least one metal from group VIb, an oxide support, and optionally phosphorus, said process comprises the following stages:

a) the at least partially spent catalyst is regenerated in an oxygen-containing gas stream at a temperature of between 300° C. and 550° C., so as to obtain a regenerated catalyst,
b) then said regenerated catalyst is brought into contact with phosphoric acid and an organic acid having each acidity constant pKa greater than 1.5,
c) a drying stage is carried out at a temperature of less than 200° C., without subsequently calcining it, so as to obtain a rejuvenated catalyst.

This is because the applicant company has observed that the implementation of this rejuvenation process made it possible to obtain a hydrotreating and/or hydrocracking catalyst with improved catalytic performance qualities compared with the regenerated catalyst.

Typically, by virtue of the improvement in the activity, the temperature necessary to achieve a desired sulfur or nitrogen content (for example 10 ppm of sulfur in the case of a gas oil feedstock, in ULSD or Ultra Low Sulfur Diesel mode) is close to that of the fresh catalyst.

Without being committed to any theory, it seems that the combination of phosphoric acid with an organic acid having an acidity constant pKa of greater than 1.5, that is to say a not too strong organic acid, makes it possible to observe a synergistic effect at the level of the catalytic activity which is not foreseeable when phosphoric acid or organic acid is used alone.

The rejuvenation in the presence of two specific acids seems to make possible good dissolution and redistribution of the metal phases in order to recover a dispersion close to the fresh catalyst and thus an activity close to the fresh catalyst, this being the case without it being inevitably necessary to add metals of the active phase.

According to one alternative form, the organic acid is chosen from acetic acid, maleic acid, malic acid, malonic acid, gluconic acid, tartaric acid, citric acid, γ-ketovaleric acid, lactic acid, pyruvic acid, ascorbic acid or succinic acid.

According to one alternative form, the organic acid is an organic acid having each acidity constant pKa greater than 3.5.

According to one alternative form, the organic acid added per metal/metals from group VIb present in the regenerated catalyst molar ratio is between 0.01 and 5 mol/mol.

According to one alternative form, the phosphorus added per metal from group VIb already present in the regenerated catalyst molar ratio is between 0.01 and 5 mol/mol.

According to one alternative form, the fresh catalyst has a content of metal from group VIb of between 1% and 40% by weight of oxide of said metal from group VIb, with respect to the weight of the catalyst, and a total content of metal from group VIII of between 1% and 10% by weight of oxide of said metal from group VIII, with respect to the weight of the catalyst.

According to one alternative form, the fresh catalyst contains phosphorus, the total content of phosphorus being between 0.1% and 20% by weight, expressed as $P_2O_5$, with respect to the total weight of the catalyst.

According to one alternative form, the oxide support of the rejuvenated catalyst is chosen from aluminas, silica, silica-aluminas or also titanium or magnesium oxides, used alone or as a mixture with alumina or silica-alumina.

According to one alternative form, stage b) additionally comprises bringing the regenerated catalyst into contact with at least one compound comprising a metal from group VIb and at least one compound comprising a metal from group VIII.

According to this alternative form, the molar ratio of the metal from group VIb added per metal from group VIb already present in the regenerated catalyst is between 0.05 and 2.5 mol/mol, and the molar ratio of the metal from group VIII added per metal from group VIII already present in the regenerated catalyst is between 0.01 and 2.5 mol/mol.

According to one alternative form, the regeneration stage is preceded by a deoiling stage which comprises bringing an at least partially spent catalyst resulting from a hydrotreating and/or hydrocracking process into contact with a stream of inert gas at a temperature of between 300° C. and 400° C.

According to one alternative form, the rejuvenated catalyst is subjected to a sulfidation stage after stage c).

The invention also relates to the use of the rejuvenated catalyst prepared according to the process of the invention in a process for the hydrotreating and/or hydrocracking of hydrocarbon cuts.

Subsequently, the groups of chemical elements are given according to the CAS classification (CRC Handbook of Chemistry and Physics, published by CRC Press, editor D. R. Lide, 81$^{st}$ edition, 2000-2001). For example, group VIII according to the CAS classification corresponds to the metals from columns 8, 9 and 10 according to the new IUPAC classification.

Hydrotreating is understood to mean reactions encompassing in particular hydrodesulfurization (HDS), hydrodenitrogenation (HDN) and hydrogenation of aromatics (HOA).

DESCRIPTION OF THE INVENTION

The rejuvenated catalyst obtained by the process according to the invention results from an at least partially spent catalyst, itself resulting from a fresh catalyst, used in a process for the hydrotreating and/or hydrocracking of hydrocarbon cuts for a certain period of time and which exhibits a significantly lower activity than the fresh catalyst, which necessitates its replacement.

Fresh Catalyst

The fresh catalyst used in a process for the hydrotreating and/or hydrocracking of hydrocarbon cuts is known to a person skilled in the art. It comprises at least one metal from group VIII, at least one metal from group VIb, an oxide support and optionally phosphorus and/or an organic compound as described below.

The metal from group VIb present in the active phase of the fresh catalyst is preferentially chosen from molybdenum and tungsten. The metal from group VIII present in the active phase of the fresh catalyst is preferentially chosen from cobalt, nickel and the mixture of these two elements. The active phase of the fresh catalyst is preferably chosen from the group formed by the combination of the elements nickel-molybdenum, cobalt-molybdenum, nickel-tungsten, nickel-molybdenum-tungsten and nickel-cobalt-molybdenum and very preferably the active phase consists of cobalt and molybdenum, nickel and molybdenum, nickel and tungsten or a nickel-molybdenum-tungsten combination.

The content of metal from group VIII is between 1% and 10% by weight, preferably between 1.5% and 9% by weight and more preferably between 2% and 8% by weight, expressed as oxide of metal from group VIII, with respect to the total weight of the fresh catalyst.

The content of metal from group VIb is between 1% and 40% by weight, preferably between 1% and 35% by weight and more preferably between 2% and 30% by weight, expressed as oxide of metal from group VIb, with respect to the total weight of the fresh catalyst.

The metal from group VIII to metal from group VIb molar ratio of the fresh catalyst is generally between 0.1 and 0.8, preferably between 0.15 and 0.6.

Optionally, the fresh catalyst can additionally exhibit a phosphorus content generally of between 0.1% and 20% by weight of $P_2O_5$, with respect to the total weight of fresh catalyst, preferably of between 0.2% and 15% by weight of $P_2O_5$, very preferably of between 0.3% and 11% by weight of $P_2O_5$. For example, the phosphorus present in the fresh catalyst is combined with the metal from group VIb and optionally also with the metal from group VIII in the form of heteropolyanions.

Furthermore, the phosphorus/(metal from group VIb) molar ratio is generally between 0.08 and 1, preferably between 0.1 and 0.9 and very preferably between 0.15 and 0.8.

The oxide support of the fresh catalyst is usually a porous solid chosen from the group consisting of: aluminas, silica, silica-aluminas and also titanium or magnesium oxides, used alone or as a mixture with alumina or silica-alumina. Preferably, the oxide support is a support based on alumina or on silica or on silica-alumina.

When the oxide support is based on alumina, it contains more than 50% by weight of alumina, with respect to the total weight of the support, and, in general, it contains only alumina or silica-alumina as defined below.

Preferably, the oxide support comprises alumina, and preferably extruded alumina. Preferably, the alumina is gamma alumina.

The alumina support advantageously exhibits a total pore volume of between 0.1 and 1.5 cm$^3$·g$^{-1}$, preferably between 0.4 and 1.1 cm$^3$·g$^{-1}$. The total pore volume is measured by mercury porosimetry according to the standard ASTM D4284 with a wetting angle of 140°, as described in the work by Rouquerol F., Rouquerol J. and Singh K., *Adsorption by Powders & Porous Solids: Principle, Methodology and Applications*, Academic Press, 1999, for example by means of an Autopore III™ model machine of the Micromeritics™ brand.

The specific surface of the alumina support is advantageously between 5 and 400 m$^2$·g$^{-1}$, preferably between 10 and 350 m$^2$·g$^{-1}$, more preferably between 40 and 350 m$^2$·g$^{-1}$. The specific surface is determined in the present invention by the BET method according to the standard ASTM D3663, which method is described in the same work cited above.

In another preferred case, the oxide support is a silica-alumina containing at least 50% by weight of alumina, with respect to the total weight of the support. The silica content in the support is at most 50% by weight, with respect to the total weight of the support, generally less than or equal to 45% by weight, preferably less than or equal to 40%.

Sources of silicon are well known to a person skilled in the art. Mention may be made, by way of examples, of silicic acid, silica in the powder form or in the colloidal form (silica sol), or tetraethyl orthosilicate $Si(OEt)_4$.

When the support for said catalyst is based on silica, it contains more than 50% by weight of silica, with respect to the total weight of the support, and, generally, it contains only silica.

According to a particularly preferred alternative form, the oxide support consists of alumina, silica or silica-alumina.

The oxide support can also advantageously additionally contain from 0.1% to 80% by weight, preferably from 0.1% to 50% by weight, of zeolite, with respect to the total weight of the support. In this case, all the sources of zeolite and all the associated preparation methods known to a person skilled in the art can be incorporated. Preferably, the zeolite is chosen from the group FAU, BEA, ISV, IWR, IWW, MEI, UWY and preferably the zeolite is chosen from the group FAU and BEA, such as zeolite Y and/or beta zeolite, and particularly preferably such as USY and/or beta zeolite.

The support is advantageously provided in the form of beads, extrudates, pellets or irregular and nonspherical agglomerates, the specific shape of which can result from a crushing stage.

The fresh catalyst can also additionally comprise at least one organic compound containing oxygen and/or nitrogen and/or sulfur before sulfidation. Such additives are known. Generally, the organic compound is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea and amide functional group or also compounds including a furan ring or also sugars.

The oxygen-containing organic compound can be one or more chosen from compounds comprising one or more chemical functional groups chosen from a carboxylic, alcohol, ether, aldehyde, ketone, ester or carbonate functional group or also compounds including a furan ring or also sugars. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy) ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known as furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate and 5-methyl-2(3H)-furanone.

The nitrogen-containing organic compound can be one or more chosen from compounds comprising one or more chemical functional groups chosen from an amine or nitrile functional group. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The organic compound containing oxygen and nitrogen can be one or more chosen from compounds comprising one or more chemical functional groups chosen from a carboxylic acid, alcohol, ether, aldehyde, ketone, ester, carbonate, amine, nitrile, imide, amide, urea or oxime functional group. By way of example, the organic compound containing oxygen and nitrogen can be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, methyl 3-(methylthio)propanoate and ethyl 3-(methylthio)propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, dimethyl succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

The content of organic compound(s) containing oxygen and/or nitrogen and/or sulfur on the fresh catalyst is between 1% and 30% by weight, preferably between 1.5% and 25% by weight and more preferably between 2% and 20% by weight, with respect to the total weight of the fresh catalyst.

The preparation of the fresh catalyst is known and generally comprises a stage of impregnation of the metals from group VIII and from group VIb and optionally of phosphorus and/or of the organic compound on the oxide support, followed by a drying operation, then by an optional calcination making it possible to obtain the active phase in their oxide forms. Before its use in a process for the hydrotreating and/or hydrocracking of hydrocarbon cuts, the fresh catalyst is generally subjected to a sulfidation in order to form the active entity as described below.

According to an alternative form of the invention, which is preferred when an organic compound is present, the fresh catalyst has not undergone calcination during its preparation, that is to say that the impregnated catalytic precursor has not been subjected to a stage of heat treatment at a temperature of greater than 200° C. under an inert atmosphere or under an oxygen-containing atmosphere, in the presence or absence of water.

According to another alternative form of the invention, the fresh catalyst has undergone a calcination stage during its preparation, that is to say that the impregnated catalytic precursor has been subjected to a stage of heat treatment at a temperature of between 200° C. and 1000° C. and preferably between 250° C. and 750° C., for a period of time typically of between 15 minutes and 10 hours, under an inert atmosphere or under an oxygen-containing atmosphere, in the presence or absence of water.

During the process for the hydrotreating and/or hydrocracking of hydrocarbon cuts, coke and sulfur as well as other contaminants resulting from the feedstock, such as silicon, arsenic and metals, are formed and/or deposited on the catalyst and transform the fresh catalyst into an at least partially spent catalyst.

An at least partially spent catalyst is understood to mean a catalyst which exits from a hydrotreating process carried out under the conditions as described below and which has not undergone a heat treatment under a gas containing air or oxygen at a temperature of greater than 200° C. (also often known as regeneration stage). It may have undergone a deoiling.

The at least partially spent catalyst is composed of the oxide support and of the active phase formed of at least one metal from group VIb and of at least one metal from group VIII and optionally of the phosphorus from the fresh catalyst, as well as carbon, sulfur and optionally other contaminants resulting from the feedstock, such as silicon, arsenic and metals.

The contents of metal from group VIb, of metal from group VIII and of phosphorus in the fresh, at least partially spent, regenerated or rejuvenated catalyst are expressed as oxides after correction for the loss on ignition of the catalyst sample in a muffle furnace at 550° C. for two hours. The loss on ignition is due to the loss of moisture, carbon, sulfur and/or other contaminants. It is determined according to ASTM D7348.

The contents of metal from group VIb, of metal from group VIII and optionally of phosphorus in the at least partially spent catalyst are substantially identical to the contents of the fresh catalyst from which it results.

It should be noted that the term "coke" or "carbon" in the present patent application denotes a substance based on hydrocarbons which is deposited on the surface of the at least partially spent hydrotreating catalyst during its use, which is highly cyclized and condensed and which has an appearance similar to graphite.

The at least partially spent catalyst contains in particular carbon at a content generally of greater than or equal to 2% by weight, preferably of between 2% and 25% by weight and more preferably still of between 4% and 16% by weight, with respect to the total weight of the at least partially spent catalyst.

Regeneration (Stage a)

The process for the rejuvenation according to the invention of the at least partially spent catalyst comprises a stage of removal of the coke and the sulfur (regeneration stage). This is because, according to stage a) of the process according to the invention, the at least partially spent catalyst is regenerated in an oxygen-containing gas stream at a temperature of between 300° C. and 550° C., so as to obtain a regenerated catalyst.

Even if this is possible, the regeneration is preferably not carried out by keeping the laden catalyst in the hydrotreating reactor (in situ regeneration). Preferably, the at least partially spent catalyst is thus extracted from the reactor and sent to a regeneration plant in order to carry out the regeneration in said plant (ex situ regeneration).

The regeneration stage a) is preferably preceded by a deoiling stage. The deoiling stage generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 $SI.I^{-1}·h^{-1}$ for 3 to 7 hours.

In an alternative form, the deoiling stage can be carried out by light hydrocarbons, by steam treatment or any other analogous process.

The deoiling stage makes it possible to remove the soluble hydrocarbons which might prove to be dangerous in the regeneration stage because they present risks of flammability under an oxidizing atmosphere.

The regeneration stage a) is generally carried out in a gas stream containing oxygen, generally air. The water content is generally between 0% and 50% by weight. The gas flow rate in terms of flow rate per unit volume of the at least partially spent catalyst is preferably from 20 to 2000 $SI.I^{-1}·h^{-1}$, more preferably from 30 to 1000 $SI.I^{-1}·h^{-1}$ and particularly preferably from 40 to 500 $SI.I^{-1}·h^{-1}$. The duration of the regeneration is preferably 2 hours or more, more preferably 2.5 hours or more and particularly preferably 3 hours or more. The regeneration of the at least partially spent catalyst is generally carried out at a temperature of between 300° C. and 550° C., preferably of between 320° C. and 520° C., in a preferred way of between 400° C. and 510° C. and particularly preferably of between 420° C. and 500° C.

The regenerated catalyst is composed of the oxide support and of the active phase formed of at least one metal from group VIb and of at least one metal from group VIII and optionally of phosphorus from the fresh catalyst. Following the regeneration, the hydrogenating function comprising the metals from group VIb and from group VIII of the regenerated catalyst is in an oxide form.

The contents of metal from group VIb, of metal from group VIII and optionally of phosphorus in the regenerated catalyst are substantially identical to the contents of the at least partially spent catalyst and to the contents of the fresh catalyst from which it results.

The regenerated catalyst is characterized by a specific surface of between 5 and 400 $m^2/g$, preferably of between 10 and 350 $m^2/g$, preferably of between 40 and 350 $m^2/g$, very preferably of between 150 and 340 $m^2/g$.

The pore volume of the regenerated catalyst is generally between 0.1 $cm^3/g$ and 1.5 $cm^3/g$, preferably between 0.3 $cm^3/g$ and 1.1 $cm^3/g$.

The regenerated catalyst obtained in the regeneration stage a) contains residual carbon at a content of less than 2% by weight, with respect to the total weight of the regenerated catalyst, preferably of between 0.1% and 2% by weight, with respect to the total weight of the regenerated catalyst, preferentially of between 0.1% and 1% by weight and particularly preferably between 0.1% and 0.5% by weight. The regenerated catalyst may also not contain residual carbon.

It should be noted that the term "residual carbon" in the present patent application means carbon (coke) remaining in the regenerated catalyst after regeneration of the spent hydrotreating catalyst. This residual carbon content in the regenerated hydrotreating catalyst is measured by elemental analysis according to the standard ASTM D5373.

The regenerated catalyst can contain residual sulfur at a content of less than 5% by weight, with respect to the total weight of the regenerated catalyst, preferably of between 0.1% and 3% by weight, with respect to the total weight of the regenerated catalyst, preferentially of between 0.1% and 2% by weight and particularly preferably between 0.1% and 0.8% by weight. The regenerated catalyst may also not contain residual sulfur. This residual sulfur content in the regenerated hydrotreating catalyst is measured by elemental analysis according to ASTM D5373.

Optionally, the regenerated catalyst can additionally exhibit a low content of contaminants resulting from the feedstock treated by the fresh catalyst from which it originates, such as silicon, arsenic and metals, such as nickel, vanadium or iron.

Preferably, the content of silicon (besides that possibly present on the fresh catalyst) is less than 2% by weight and very preferably less than 1% by weight, with respect to the total weight of the regenerated catalyst.

Preferably, the arsenic content is less than 2000 ppm by weight and very preferably less than 1000 ppm by weight, with respect to the total weight of the regenerated catalyst.

Preferably, the content for each of the metals, nickel, vanadium or iron, is less than 1% by weight and very preferably less than 5000 ppm by weight, with respect to the total weight of the regenerated catalyst.

Rejuvenation (Stage b)

The rejuvenation process according to the invention comprises, after the regeneration stage a), a stage b) according to which said regenerated catalyst is brought into contact with phosphoric acid and an organic acid having each acidity constant pKa greater than 1.5.

The organic acid can contain one or more carboxylic functional groups, each acidity constant being greater than 1.5 and preferably greater than 3.0 and particularly preferably greater than 3.5. The acidity constant is measured at 25° C. in water. The organic acid can contain, in addition to the carboxylic functional group(s), other chemical functional groups of alcohol, ether, aldehyde, ketone or ester type.

The organic acid is preferably chosen from acetic acid, maleic acid, malic acid, malonic acid, gluconic acid, tartaric acid, citric acid, γ-ketovaleric acid, lactic acid, pyruvic acid, ascorbic acid or also succinic acid and preferably the organic acid is chosen from acetic acid, citric acid and γ-ketovaleric acid. These acids have the following acidity constants:

acetic acid $pK_a=4.76$
maleic acid $pK_{a1}=1.89$ $pK_{a2}=6.23$
malic acid $pK_{a1}=3.46$ $pK_{a2}=5.10$
malonic acid $pK_{a1}=2.85$ $pK_{a2}=5.70$
gluconic acid $pK_a=3.86$
tartaric acid $pK_{a1}=2.50$ $pK_{a2}=4.20$
citric acid $pK_{a1}=3.13$ $pK_{a2}=4.76$ $pK_{a3}=6.40$
γ-ketovaleric acid $pK_{a1}=4.64$
lactic acid $pK_a=3.86$
pyruvic acid $pK_a=2.49$
ascorbic acid $pK_{a1}=4.10$ $pK_{a2}=11.80$
succinic acid $pK_{a1}=4.21$ $pK_{a2}=5.64$ The organic acid is advantageously introduced into an impregnation solution in an amount corresponding:

- to a molar ratio of organic acid added per metal/metals from group VIb present in the regenerated catalyst of between 0.01 and 5 mol/mol, preferably of between 0.05 and 3 mol/mol, in a preferred way of between 0.05 and 2 mol/mol and very preferably of between 0.1 and 1.5 mol/mol, and
- to a molar ratio of organic acid added per metal/metals from group VIII present in the regenerated catalyst of between 0.02 and 17 mol/mol, preferably of between 0.1 and 10 mol/mol, in a preferred way of between 0.15 and 5 mol/mol and very preferably of between 0.2 and 3.5 mol/mol.

When several organic acids are present, the different molar ratios apply for each of the organic acids present.

With regard to the phosphoric acid, this is advantageously introduced into the impregnation solution in an amount corresponding to a molar ratio of phosphorus added per metal from group VIb already present in the regenerated catalyst of between 0.01 and 5 mol/mol, preferably of between 0.05 and 3 mol/mol, in a preferred way of between 0.05 and 2 mol/mol and very preferably of between 0.1 and 1.5 mol/mol.

Stage b) of bringing said regenerated catalyst into contact with an impregnation solution containing phosphoric acid and an organic acid having each acidity constant pKa greater than 1.5 can be carried out either by slurry impregnation, or by excess impregnation, or by dry impregnation, or by any other means known to a person skilled in the art.

Equilibrium (or excess) impregnation consists in immersing the support or the catalyst in a volume of solution (often considerably) greater than the pore volume of the support or of the catalyst while keeping the system stirred in order to improve the exchanges between the solution and the support or catalyst. An equilibrium is finally reached after diffusion of the different entities into the pores of the support or catalyst. Control of the amount of elements deposited is provided by the prior measurement of an adsorption isotherm which relates the concentration of the elements to be deposited contained in the solution to the amount of the elements deposited on the solid in equilibrium with this solution.

Dry impregnation consists, for its part, in introducing a volume of impregnation solution equal to the pore volume of the support or of the catalyst. Dry impregnation makes it possible to deposit, on a given support or catalyst, all of the metals and additives contained in the impregnation solution.

Stage b) can advantageously be carried out by one or more excess impregnations of solution or preferably by one or more dry impregnations and very preferably by a single dry impregnation of said regenerated catalyst, using the impregnation solution.

The phosphoric acid and the organic acid can be introduced together in a single impregnation stage (coimpregnation) or independently in several impregnation stages, and this in any order.

The impregnation solution is preferably an aqueous solution comprising phosphoric acid and at least one organic acid having each acidity constant pKa greater than 1.5. Preferably, the impregnation solution consists of water, phosphoric acid and at least one organic acid having each acidity constant pKa greater than 1.5.

According to one alternative form, the contacting operation of stage b) is carried out by bringing the regenerated catalyst into contact with an impregnation solution, preferably an aqueous impregnation solution, which contains only phosphoric acid and at least one organic acid having each acidity constant pKa greater than 1.5.

Although the addition of metals to the regenerated catalyst is not necessary in order to obtain a catalytic activity of the rejuvenated catalyst close to the fresh catalyst, it can be advantageous in certain cases to add metal precursors to the impregnation solution of the rejuvenation.

Thus, according to a second alternative form, the contacting stage b) can also comprise bringing the regenerated catalyst into contact with at least one compound comprising a metal from group VIb and/or at least one compound comprising a metal from group VIII, in addition to phosphoric acid and the organic acid having each acidity constant pKa greater than 1.5.

The metal from group VIb introduced is preferentially chosen from molybdenum and tungsten. The metal from group VIII introduced is preferentially chosen from cobalt, nickel and the mixture of these two elements. Preferably, the combination of the elements nickel-molybdenum, cobalt-molybdenum, nickel-tungsten, nickel-molybdenum-tungsten and nickel-cobalt-molybdenum is chosen and very preferably the active phase consists of cobalt and molybdenum, nickel and molybdenum, nickel and tungsten or a nickel-molybdenum-tungsten combination.

The metal from group VIb introduced and/or the metal from group VIII introduced may or may not be identical to the metals already present in the regenerated catalyst.

By way of example, use may be made, among the sources of molybdenum, of the oxides and hydroxides, molybdic acids and their salts, in particular the ammonium salts, such as ammonium molybdate, ammonium heptamolybdate, phosphomolybdic acid ($H_3PMo_{12}O_{40}$), and their salts, and optionally silicomolybdic acid ($H_4SiMo_{12}O_{40}$) and its salts. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and their salts, in particular the ammonium salts, such as ammonium tungstate, ammonium metatungstate, phosphotungstic acid and their salts, and optionally silicotungstic acid ($H_4SiW_{12}O_{40}$) and its salts. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

When a compound comprising a metal from group VIb is introduced, the molar ratio of the metal from group VIb added per metal from group VIb already present in the regenerated catalyst is between 0.05 and 2.5 mol/mol, preferably between 0.05 and 2.0 mol/mol and more preferably still between 0.05 and 1.0 mol/mol.

When a compound comprising a metal from group VIII is introduced, the molar ratio of the metal from group VIII added per metal from group VIII already present in the regenerated catalyst is between 0.01 and 2.5 mol/mol, preferably between 0.01 and 2.0 mol/mol and more preferably still between 0.05 and 1.0 mol/mol.

According to this second alternative form, the contacting operation of stage b) is carried out by bringing the regenerated catalyst into contact with an impregnation solution, preferably an aqueous impregnation solution, which contains only phosphoric acid, at least one organic acid having each acidity constant pKa greater than 1.5 and at least one metal precursor (that is to say, the compound(s) comprising a metal from group VIb and/or the compound(s) comprising a metal from group VIII).

When it is desired to also introduce at least one compound comprising a metal from group VIb and/or at least one compound comprising a metal from group VIII onto the regenerated catalyst, the contacting stage b) comprises several embodiments. They are distinguished in particular by the moment at which the mixture of phosphoric and organic acids is introduced, which introduction can be carried out either at the same time as the impregnation of the metals (coimpregnation), or after the impregnation of the metals (postimpregnation), or before the impregnation of the metals (preimpregnation). In addition, it is possible to combine the embodiments. Preferably, a coimpregnation is carried out.

Advantageously, after each impregnation stage, whether this is a stage of impregnation of the mixture of acids, with or without the metals, or a stage of impregnation of the metals alone, the impregnated regenerated catalyst is left to mature. Maturation makes it possible for the impregnation solution to disperse homogeneously within the regenerated catalyst.

Any maturation stage is advantageously carried out at atmospheric pressure, in a water-saturated atmosphere and at a temperature of between 17° C. and 50° C., and preferably at ambient temperature. Generally, a maturation time of between ten minutes and forty-eight hours, preferably of between thirty minutes and fifteen hours and particularly preferably between thirty minutes and six hours is sufficient.

Any impregnation solution described in the present invention may comprise any polar solvent known to a person skilled in the art. Said polar solvent used is advantageously chosen from the group formed by methanol, ethanol, water, phenol and cyclohexanol, taken alone or as a mixture. Said polar solvent can also advantageously be chosen from the group formed by propylene carbonate, DMSO (dimethyl sulfoxide), N-methylpyrrolidone (NMP) and sulfolane, taken alone or as a mixture. Preferably, a polar protic solvent is used. A list of the common polar solvents and also their dielectric constants can be found in the book Solvents and Solvent *Effects in Organic Chemistry*, C. Reichardt, Wiley-VCH, 3rd edition, 2003, pages 472-474. Very preferably, the solvent used is water or ethanol and particularly preferably the solvent is water. In one possible embodiment, the solvent can be absent from the impregnation solution.

When several impregnation stages are carried out, each impregnation stage is preferably followed by an intermediate drying stage at a temperature of less than 200° C., advantageously of between 50° C. and 180° C., preferably between 70° C. and 150° C., very preferably between 75° C. and 130° C., and optionally a maturation period has been observed between the impregnation stage and the intermediate drying stage.

Drying (Stage c)

After the rejuvenation stage, the catalyst is subjected to a drying stage at a temperature of less than 200° C., advantageously of between 50° C. and 180° C., preferably between 70° C. and 150° C., very preferably between 75° C. and 130° C., without a subsequent calcination stage.

The drying stage is preferentially carried out under an inert atmosphere or under an oxygen-containing atmosphere.

The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or air. Preferably, the drying stage has a duration of between 5 minutes and 4 hours, preferably between 30 minutes and 4 hours and very preferably between 1 hour and 3 hours.

The drying is carried out so as to preferably retain at least 30% by weight of the organic acid introduced during an impregnation stage; preferably, this amount is greater than 50% by weight and more preferably still greater than 70% by weight, calculated on the basis of the carbon remaining on the rejuvenated catalyst.

It is important to emphasize that the rejuvenated catalyst does not undergo calcination after the introduction of the phosphoric acid and of the organic acid in order to preserve, at least in part, the organic acid in the catalyst. Calcination is understood here to mean a heat treatment under a gas containing air or oxygen at a temperature of greater than or equal to 200° C.

On conclusion of the drying stage, a rejuvenated catalyst is then obtained, which catalyst will preferably be subjected to an optional activation (sulfidation) stage for its subsequent use in a hydrotreating and/or hydrocracking process.

Rejuvenated Catalyst

The rejuvenated catalyst is composed of the oxide support and of the active phase formed of at least one metal from group VIb and of at least one metal from group VIII, of phosphorus and of the organic acid.

The total content of metal from group VIII (present in the regenerated catalyst and optionally introduced by impregnation during stage b) is between 1% and 15% by weight of oxide of the metal from group VIII, with respect to the total weight of the rejuvenated catalyst, preferably between 1.5% and 12% by weight, preferably between 2% and 10% by weight, of oxide of the metal from group VIII, with respect to the total weight of the rejuvenated catalyst.

The total content of metal from group VIb (present in the regenerated catalyst and optionally introduced by impregnation during stage b) is between 5% and 45% by weight of oxide of the metal from group VIb, with respect to the total weight of the rejuvenated catalyst, preferably between 8% and 40% by weight, very preferably between 10% and 30% by weight, of oxide of the metal from group VIb, with respect to the total weight of the rejuvenated catalyst.

The metal from group VIII to metal from group VIb molar ratio of the rejuvenated catalyst is generally between 0.1 and 0.8, preferably between 0.2 and 0.6.

The content of organic acid(s) on the rejuvenated catalyst is between 1% and 45% by weight, preferably between 2% and 30% by weight and more preferably between 3% and 25% by weight, with respect to the total weight of the rejuvenated catalyst.

The total content of phosphorus (introduced by phosphoric acid during stage b) and optionally already present in the regenerated catalyst) in the rejuvenated catalyst is generally between 0.3% and 25% by weight of $P_2O_5$, with respect to the total weight of catalyst, preferably between 0.5% and 20% by weight of $P_2O_5$, with respect to the total weight of catalyst, very preferably between 1% and 15% by weight of $P_2O_5$, with respect to the total weight of catalyst.

Sulfidation (Optional Stage)

Before its use in the hydrotreating and/or hydrocracking reaction, it is advantageous to transform the rejuvenated catalyst obtained according to the process according to the invention into a sulfided catalyst in order to form its active entity. This activation or sulfidation stage is carried out by methods well known to a person skilled in the art, and advantageously under a sulfo-reductive atmosphere in the presence of hydrogen and hydrogen sulfide.

On conclusion of stage c) of the rejuvenation process according to the invention, said rejuvenated catalyst is thus advantageously subjected to a sulfidation stage, without an intermediate calcination stage.

Said rejuvenated catalyst is advantageously sulfided ex situ or in situ. The sulfiding agents are $H_2S$ gas, elemental sulfur, $CS_2$, mercaptans, sulfides and/or polysulfides, hydrocarbon cuts having a boiling point of less than 400° C. containing sulfur compounds or any other sulfur-containing compound used for the activation of hydrocarbon feedstocks with a view to sulfiding the catalyst. Said sulfur-containing compounds are advantageously chosen from alkyl disulfides, such as, for example, dimethyl disulfide (DMDS), alkyl sulfides, such as, for example, dimethyl sulfide, thiols, such as, for example, n-butyl mercaptan (or 1-butanethiol), and polysulfide compounds of tert-nonyl polysulfide type. The catalyst can also be sulfided by the sulfur contained in the feedstock to be desulfurized. Preferably, the catalyst is sulfided in situ in the presence of a sulfiding agent and of a hydrocarbon feedstock. Very preferably, the catalyst is sulfided in situ in the presence of a hydrocarbon feedstock additivated with dimethyl disulfide.

Hydrotreating and/or Hydrocracking Process

Finally, another subject matter of the invention is the use of the rejuvenated catalyst according to the invention in processes for the hydrotreating and/or hydrocracking of hydrocarbon cuts.

The process for the hydrotreating and/or hydrocracking of hydrocarbon cuts can be carried out in one or more reactors in series of the fixed bed type or of the ebullated bed type.

The process for the hydrotreating and/or hydrocracking of hydrocarbon cuts is carried out in the presence of a rejuvenated catalyst. It can also be carried out in the presence of a mixture of a rejuvenated catalyst and of a fresh catalyst or of a regenerated catalyst.

When the fresh or regenerated catalyst is present, it comprises at least one metal from group VIII, at least one metal from group VIb and an oxide support, and optionally phosphorus and/or an organic compound such as are described above.

The active phase and the support of the fresh or regenerated catalyst may or may not be identical to the active phase and to the support of the rejuvenated catalyst.

The active phase and the support of the fresh catalyst may or may not be identical to the active phase and to the support of the regenerated catalyst.

When the process for the hydrotreating and/or hydrocracking of hydrocarbon cuts is carried out in the presence of a rejuvenated catalyst and of a fresh or regenerated catalyst, it can be carried out in a reactor of the fixed bed type containing several catalytic beds.

In this case, and according to a first alternative form, a catalytic bed containing the fresh or regenerated catalyst can precede a catalytic bed containing the rejuvenated catalyst in the direction of the circulation of the feedstock.

In this case, and according to a second alternative form, a catalytic bed containing the rejuvenated catalyst can precede a catalytic bed containing the fresh or regenerated catalyst in the direction of the circulation of the feedstock.

In this case, and according to a third alternative form, a catalytic bed can contain a mixture of a rejuvenated catalyst and of a fresh catalyst and/or of a regenerated catalyst.

In these cases, the operating conditions are those described above. They are generally identical in the different catalytic beds except for the temperature, which generally increases in a catalytic bed following the exothermicity of the hydrodesulfurization reactions.

When the process for the hydrotreating and/or hydrocracking of hydrocarbon cuts is carried out in the presence of a rejuvenated catalyst and of a fresh or regenerated catalyst in several reactors in series of the fixed bed type or of the ebullated bed type, one reactor can comprise a rejuvenated catalyst while another reactor can comprise a fresh or regenerated catalyst, or a mixture of a rejuvenated catalyst and of a fresh and/or regenerated catalyst, and this in any order. It is possible to provide a device for the removal of the $H_2S$ from the effluent resulting from the first hydrodesulfurization reactor before treating said effluent in the second hydrodesulfurization reactor. In these cases, the operating conditions are those described above and may or may not be identical in the different reactors.

The rejuvenated catalyst which has preferably undergone a sulfidation stage beforehand is advantageously used in reactions for the hydrotreating and/or hydrocracking of hydrocarbon feedstocks, such as petroleum cuts, cuts resulting from coal, or hydrocarbons produced from natural gas, optionally as mixtures, or also from a hydrocarbon cut resulting from biomass and more particularly in reactions for the hydrogenation, hydrodenitrogenation, hydrodearomatization, hydrodesulfurization, hydrodeoxygenation, hydrodemetallization or hydroconversion of hydrocarbon feedstocks.

In these uses, the rejuvenated catalyst which has preferably undergone a sulfidation stage beforehand exhibits an improved activity in comparison with the catalysts of the prior art. This catalyst can also advantageously be used during the pretreatment of catalytic cracking or hydrocracking feedstocks, or the hydrodesulfurization of residues or the forced hydrodesulfurization of gas oils (ULSD: Ultra Low Sulfur Diesel).

The feedstocks employed in the hydrotreating process are, for example, gasolines, gas oils, vacuum gas oils, atmospheric residues, vacuum residues, atmospheric distillates, vacuum distillates, heavy fuel oils, oils, waxes and paraffins, spent oils, deasphalted residues or crudes, feedstocks originating from thermal or catalytic conversion processes, lignocellulose feedstocks or, more generally, feedstocks resulting from biomass, taken alone or as a mixture. The feedstocks which are treated, and in particular those mentioned above, generally contain heteroatoms, such as sulfur, oxygen and nitrogen, and, for the heavy feedstocks, they usually also contain metals.

The operating conditions used in the processes implementing the reactions for the hydrotreating of hydrocarbon feedstocks described above are generally as follows: the temperature is advantageously between 180° C. and 450° C. and preferably between 250° C. and 440° C., the pressure is advantageously between 0.5 and 30 MPa and preferably between 1 and 18 MPa, the hourly space velocity is advantageously between 0.1 and 20 $h^{-1}$ and preferably between 0.2 and 5 $h^{-1}$, and the hydrogen/feedstock ratio, expressed as volume of hydrogen, measured under standard temperature and pressure conditions, per volume of liquid feedstock, is advantageously between 50 l/l and 5000 l/l and preferably 80 and 2000 l/l.

According to a first mode of use, said hydrotreating process is a process for the hydrotreating, and in particular for the hydrodesulfurization (HDS), of a gas oil cut carried out in the presence of at least one rejuvenated catalyst according to the invention. Said hydrotreating process is targeted at removing the sulfur-based compounds present in said gas oil cut so as to meet the environmental standards in force, namely a permitted sulfur content of up to 10 ppm. It also makes it possible to reduce the contents of aromatics and of nitrogen of the gas oil cut to be hydrotreated.

Said gas oil cut to be hydrotreated contains from 0.02% to 5.0% by weight of sulfur. It advantageously results from the straight-run distillation (or straight-run gas oil) of a coking unit, of a visbreaking unit, of a steam cracking unit, of a unit for the hydrotreating and/or hydrocracking of heavier feedstocks and/or of a catalytic cracking (Fluid Catalytic Cracking) unit. Said gas oil cut preferentially exhibits at least 90% of compounds with a boiling point of between 250° C. and 400° C. at atmospheric pressure.

The process for the hydrotreating of said gas oil cut is carried out under the following operating conditions: a temperature of between 200° C. and 400° C., preferentially between 300° C. and 380° C., a total pressure of between 2 MPa and 10 MPa and more preferentially between 3 MPa and 8 MPa, with a ratio of the volume of hydrogen per volume of hydrocarbon feedstock, expressed as volume of hydrogen, measured under standard temperature and pressure conditions, per volume of liquid feedstock, of between 100 and 600 liters per liter and more preferentially between 200 and 400 liters per liter, and an hourly space velocity (HSV) of between 1 and 10 $h^{-1}$, preferentially between 2 and 8 $h^{-1}$. The HSV corresponds to the inverse of the contact time expressed in hours and is defined by the ratio of the flow rate by volume of liquid hydrocarbon feedstock per volume of catalyst charged to the reaction unit implementing the hydrotreating process according to the invention. The reaction unit implementing the process for the hydrotreating of said gas oil cut is preferentially operated as a fixed bed, as a moving bed or as an ebullated bed, preferably as a fixed bed.

According to a second mode of use, said hydrotreating and/or hydrocracking process is a process for the hydrotreating (in particular hydrodesulfurization, hydrodenitrogenation, hydrogenation of aromatics) and/or hydrocracking of a vacuum distillate cut carried out in the presence of at least one rejuvenated catalyst according to the invention. Said hydrotreating and/or hydrocracking process, otherwise known as hydrocracking pretreatment or hydrocracking process, is targeted, as the case may be, at removing the sulfur-based, nitrogen-based or aromatic compounds present in said distillate cut so as to carry out a pretreatment before conversion in catalytic cracking or hydroconversion processes, or at hydrocracking the distillate cut which would optionally have been pretreated beforehand, if necessary.

Highly varied feedstocks can be treated by the processes for the hydrotreating and/or hydrocracking of vacuum distillates described above. Generally, they contain at least 20% by volume and often at least 80% by volume of compounds boiling above 340° C. at atmospheric pressure. The feedstock can, for example, be vacuum distillates and also feedstocks originating from units for the extraction of aromatics from lubricant oil bases or resulting from the solvent dewaxing of lubricant oil bases, and/or from deasphalted oils, or also the feedstock can be a deasphalted oil or paraffins resulting from the Fischer-Tropsch process, or also any mixture of the feedstocks mentioned above. In general, the feedstocks have a T5 boiling point of greater than 340° C. at atmospheric pressure and better still of greater than 370° C. at atmospheric pressure, that is to say that 95% of the compounds present in the feedstock have a boiling point of greater than 340° C. and better still of greater than 370° C. The nitrogen content of the feedstocks treated in the processes according to the invention is usually greater than 200 ppm by weight, preferably between 500 and 10 000 ppm by weight. The sulfur content of the feedstocks treated in the processes according to the invention is usually between 0.01% and 5.0% by weight. The feedstock can optionally contain metals (for example nickel and vanadium). The content of asphaltenes is generally less than 3000 ppm by weight.

The rejuvenated catalyst is generally brought into contact, in the presence of hydrogen, with the feedstocks described above, at a temperature of greater than 200° C., generally of between 250° C. and 480° C., advantageously of between 320° C. and 450° C., preferably of between 330° C. and 435° C., under a pressure of greater than 1 MPa, generally of between 2 and 25 MPa, preferably of between 3 and 20 MPa, the space velocity being between 0.1 and 20.0 $h^{-1}$ and preferably 0.1-6.0 $h^{-1}$, preferably 0.2-3.0 $h^{-1}$, and the amount of hydrogen introduced is such that the liter of hydrogen/liter of hydrocarbon ratio by volume, expressed as volume of hydrogen, measured under standard temperature and pressure conditions, per volume of liquid feedstock, is between 80 and 5000 l/l and generally between 100 and 2000 l/l. These operating conditions used in the processes according to the invention generally make it possible to obtain conversions per pass, into products having boiling points of less than 340° C. at atmospheric pressure and better still of less than 370° C. at atmospheric pressure, of greater than 15% and more preferably still of between 20% and 95%.

The processes for the hydrotreating and/or hydrocracking of vacuum distillates employing the rejuvenated catalysts according to the invention cover the pressure and conversion ranges extending from mild hydrocracking to high-pressure hydrocracking. Mild hydrocracking is understood to mean a hydrocracking which results in moderate conversions, generally of less than 40%, and which operates at low pressure, preferably between 2 MPa and 6 MPa.

The rejuvenated catalyst according to the invention can be used alone, in a single or several fixed bed catalytic beds, in one or more reactors, in a "one-stage" hydrocracking scheme, with or without liquid recycling of the unconverted fraction, or also in a "two-stage" hydrocracking scheme, optionally in combination with a hydrorefining catalyst located upstream of the rejuvenated catalyst.

According to a third mode of use, said hydrotreating and/or hydrocracking process is advantageously employed as pretreatment in a fluidized bed catalytic cracking (or FCC: Fluid Catalytic Cracking) process. The operating conditions of the pretreatment in terms of range of temperature, pressure, hydrogen recycling rate and hourly space velocity are generally identical to those described above for the processes for the hydrotreating and/or hydrocracking of vacuum distillates. The FCC process can be carried out in a conventional manner known to a person skilled in the art under suitable cracking conditions for the purpose of producing hydrocarbon products of lower molecular weight. A summary description of catalytic cracking will be found, for example, in Ullmann's Encyclopedia of Industrial Chemistry Volume A18, 1991, pages 61 to 64.

According to a fourth mode of use, said hydrotreating and/or hydrocracking process according to the invention is a process for the hydrotreating (in particular hydrodesulfurization) of a gasoline cut in the presence of at least one rejuvenated catalyst according to the invention.

Unlike other hydrotreating processes, the hydrotreating (in particular the hydrodesulfurization) of gasolines has to make it possible to respond to a twofold conflicting constraint: to provide extreme hydrodesulfurization of gasolines and to limit the hydrogenation of the unsaturated compounds present in order to limit the loss in octane number.

The feedstock is generally a hydrocarbon cut having a distillation range of between 30° C. and 260° C. Preferably, this hydrocarbon cut is a cut of the gasoline type. Very preferably, the gasoline cut is an olefinic gasoline cut resulting, for example, from a catalytic cracking (Fluid Catalytic Cracking) unit.

The hydrotreating process consists in bringing the hydrocarbon cut into contact with the rejuvenated catalyst and hydrogen under the following conditions: at a temperature of between 200° C. and 400° C., preferably of between 230° C. and 330° C., at a total pressure of between 1 and 3 MPa, preferably of between 1.5 and 2.5 MPa, at an hourly space velocity (HSV), defined as being the flow rate by volume of feedstock with respect to the volume of catalyst, of between 1 and 10 $h^{-1}$, preferably of between 2 and 6 $h^{-1}$, and at a hydrogen/gasoline feedstock ratio by volume of between 100 and 600 Sl/l, preferably of between 200 and 400 Sl/l.

The process for the hydrotreating of the gasolines can be carried out in one or more reactors in series of the fixed bed type or of the ebullated bed type. If the process is carried out by means of at least two reactors in series, it is possible to provide a device for the removal of the $H_2S$ from the effluent resulting from the first hydrodesulfurization reactor before treating said effluent in the second hydrodesulfurization reactor.

The examples which follow demonstrate the significant gain in activity on the rejuvenated catalysts prepared according to the process according to the invention in comparison with the catalysts of the prior art.

EXAMPLES

Example 1: Obtaining the Regenerated Catalyst C1

A hydrotreating catalyst was used in a refinery for 4 years on a unit for the hydrodesulfurization of gasolines. The spent catalyst contains 4.5 wt % of carbon and 4.5% of sulfur. After a deoiling stage, the catalyst undergoes a regeneration under an oxidizing atmosphere at 450° C. The regenerated catalyst C1, which contains cobalt, molybdenum and phosphorus, the contents of which as oxide equivalents are 2.2% CoO, 10.6% $MoO_3$ and 1.4% $P_2O_5$, supported on a delta-theta alumina, is obtained. The water retention volume of the catalyst C1 is 0.85 cc/g. The retention volume is determined as follows: Deionized water is run dropwise, using a graduated burette, onto a known mass of support, placed in a crystallizing dish rotated using a motor, while the support is manually mixed using a spatula. When the support begins to adhere to the wall of the crystallizing dish, the dropwise addition is halted and the volume of water used is noted. The volume of water/mass of support ratio, the water uptake volume (WUV), expressed in cm$^3$/g, is then calculated.

Example 2: Preparation of the Catalysts C2, C3 and C4 not in Accordance with the Invention An aqueous solution containing phosphoric acid is dry impregnated on the catalyst C1, so as to have a P added/Mo present molar ratio of 0.25. After a maturation of 3 h, the catalyst is dried at 120° C. for 2 h. The catalyst C2 is obtained. The catalyst C3 is obtained by the same stages, except that the P added/Mo present molar ratio is 0.75. The catalyst C4 is obtained by the same stages, except that the impregnation solution consists of citric acid, so as to obtain a citric acid added/Mo present molar ratio of 0.5.

Example 3: Preparation of the Catalyst C5 not in Accordance with the Invention

The catalyst C5 is prepared from the same regenerated catalyst C1 on which a solution containing phosphoric acid and oxalic acid (pKa1=1.3) is dry impregnated, so as to have the P added/Mo present molar ratio of 0.25 and the oxalic acid added/Mo present molar ratio of 0.5. After a maturation of 3 h, the catalyst is dried at 120° C. for 2 h.

Example 4: Preparation of the Catalysts C6, C7 and C8 in Accordance with the Invention The catalyst C6 is prepared from the same regenerated catalyst C1 on which a solution containing phosphoric acid and citric acid (pKa1=3.1) is dry impregnated, so as to have the P added/Mo present molar ratio of 0.25 and the citric acid added/Mo present molar ratio of 0.5. After a maturation of 3 h, the catalyst is dried at 120° C. for 2 h. The catalyst C7 is obtained by the same stages, except that the impregnation solution consists of phosphoric acid and of gluconic acid (pKa1=3.9), so as to obtain the P added/Mo present molar ratio of 0.25 and the gluconic acid added/Mo present molar ratio of 0.5. The catalyst C8 is obtained by the same stages, except that the impregnation solution consists of phosphoric acid and of γ-ketovaleric acid (pKa1=4.6), so as to obtain the P added/Mo present molar ratio of 0.8 and the γ-ketovaleric acid added/Mo present molar ratio of 0.5.

Example 5: Preparation of the Catalyst C9 in Accordance with the Invention

The catalyst C9 is prepared from the same regenerated catalyst C1 on which a solution containing phosphoric acid, gluconic acid (pKa1=3.9), cobalt hydroxide and molybdenum oxide is dry impregnated, so as to obtain ratios of metals added with respect to the regenerated catalyst of 0.19 and 0.13 for respectively cobalt and molybdenum, and the P added/Mo present molar ratio of 0.25 and the citric acid added/Mo present molar ratio of 0.5. After a maturation of 3 h, the catalyst is dried at 120° C. for 2 h.

Example 6: Evaluation in the Hydrodesulfurization (HDS) of Gasolines of the Catalysts C2, C3, C4 and C5 (not in Accordance with the Invention) and C6, C7, C8 and C9 (in Accordance with the Invention)

The catalysts C2, C3, C4 and C5 (not in accordance with the invention) and C6, C7, C8 and C9 (in accordance with the invention) were tested in the HDS of gasolines. The regenerated catalyst C1 was also tested and serves as reference.

A model feedstock representative of a catalytic cracking (FCC) gasoline containing 10% by weight of 2,3-dimethyl-but-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization reaction (HDS) is carried out in a fixed traversed bed reactor under a total pressure of 1.5 MPa, at 210° C., at HSV=6 h$^{-1}$ (HSV=flow rate by volume of feedstock/volume of catalyst) and an H$_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts tested are given in table 1. They are expressed in degrees Celsius with respect to the regenerated catalyst C1 chosen as reference: they correspond to the temperature difference to be applied in order to achieve 50 ppm of sulfur in the effluent. A negative value means that the target for sulfur content is achieved for a lower temperature and that there is thus a gain in activity.

The use of acid alone or the combination of phosphoric acid with an organic acid with a pKa$_1$<1.5 is less effective than the joint use of phosphoric acid with an organic acid with a pKa$_1$>1.5.

TABLE 1

| Catalyst | Catalyst | pKa1 organic acid | P added/ Mo present | Acid added/Mo present | delta T ° C./regenerated |
|---|---|---|---|---|---|
| Reference C1 | Regenerated | — | — | — | 0 |
| Comparative C2 | H$_3$PO$_4$ alone | — | 0.25 | — | −0.5 |
| Comparative C3 | H$_3$PO$_4$ alone | — | 0.75 | — | −0.8 |
| Comparative C4 | Citric acid alone | 3.1 | — | 0.5 | −1.2 |
| Comparative C5 | H$_3$PO$_4$ + oxalic acid | 1.3 | 0.25 | 0.5 | −3.1 |

TABLE 1-continued

| Catalyst | Catalyst | pKa1 organic acid | P added/ Mo present | Acid added/Mo present | delta T ° C./regenerated |
|---|---|---|---|---|---|
| Invention C6 | $H_3PO_4$ + citric acid | 3.1 | 0.25 | 0.5 | −4.4 |
| Invention C7 | $H_3PO_4$ + gluconic acid | 3.9 | 0.25 | 0.5 | −5.0 |
| Invention C8 | $H_3PO_4$ + γ-ketovaleric acid | 4.6 | 0.25 | 0.5 | −5.1 |
| Invention C9 | $H_3PO_4$ + gluconic acid + CoO + $MoO_3$ | 3.9 | 0.25 | 0.5 | −6.2 |

Example 7: Obtaining the Regenerated Catalyst C10

A hydrotreating catalyst was used in a refinery for 2 years on a unit for the hydrodesulfurization of gas oil. The spent catalyst contains 13 wt % of carbon and 8.5% of sulfur. After a deoiling stage, the catalyst undergoes a regeneration under an oxidizing atmosphere at 500° C. The regenerated catalyst C10, which contains cobalt, molybdenum and phosphorus, the contents of which as oxide equivalents are 3.9% CoO, 19.5% $MoO_3$ and 5.3% $P_2O_5$, supported on a gamma alumina, is obtained. The water retention volume of the catalyst C10 is 0.4 cc/g.

Example 8: Preparation of the Catalysts C11, C12 and C13 not in Accordance with the Invention An aqueous solution containing phosphoric acid is dry impregnated on the catalyst C10, so as to have a P added/Mo present molar ratio of 0.25. After a maturation of 3 h, the catalyst is dried at 120° C. for 2 h. The catalyst C11 is obtained. The catalyst C12 is obtained by the same stages, except that the P added/Mo present molar ratio is 0.75. The catalyst C13 is obtained by the same stages, except that the impregnation solution consists of citric acid, so as to obtain a citric acid added/Mo present molar ratio of 0.5.

Example 9: Preparation of the Catalyst C14 not in Accordance with the Invention The catalyst C14 is prepared from the same regenerated catalyst C10 on which a solution containing phosphoric acid and oxalic acid (pKa1=1.3) is dry impregnated, so as to have the P added/Mo present molar ratio of 0.25 and the oxalic acid added/Mo present molar ratio of 0.5. After a maturation of 3 h, the catalyst is dried at 120° C. for 2 h.

Example 10: Preparation of the Catalysts C15, C16 and C17 in Accordance with the Invention The catalyst C15 is prepared from the same regenerated catalyst C10 on which a solution containing phosphoric acid and citric acid (pKa1=3.1) is dry impregnated, so as to have the P added/Mo present molar ratio of 0.25 and the citric acid added/Mo present molar ratio of 0.5. After a maturation of 3 h, the catalyst is dried at 120° C. for 2 h. The catalyst C16 is obtained by the same stages, except that the impregnation solution consists of phosphoric acid and of gluconic acid (pKa1=3.9), so as to obtain the P added/Mo present molar ratio of 0.25 and the gluconic acid added/Mo present molar ratio of 0.5. The catalyst C17 is obtained by the same stages, except that the impregnation solution consists of phosphoric acid and of γ-ketovaleric acid (pKa1=4.6), so as to obtain the P added/Mo present molar ratio of 0.8 and the γ-ketovaleric acid/Mo present molar ratio of 0.5.

Example 11: Preparation of the Catalyst C18 in Accordance with the Invention The catalyst C18 is prepared from the same regenerated catalyst C10 on which a solution containing phosphoric acid, gluconic acid (pKa1=3.9), cobalt hydroxide and molybdenum oxide is dry impregnated, so as to obtain ratios of metals added with respect to the regenerated catalyst of 0.19 and 0.13 for respectively cobalt and molybdenum, and the P added/Mo present molar ratio of 0.25 and the citric acid added/Mo present molar ratio of 0.5. After a maturation of 3 h, the catalyst is dried at 120° C. for 2 h.

Example 12: Evaluation in the Hydrodesulfurization (HDS) of Gas Oil of the Catalysts C11, C12, C13 and C14 (not in Accordance with the Invention) and C15, C16, C17 and C18 (in Accordance with the Invention)

The catalysts C11, C12, C13 and C14 (not in accordance with the invention) and C15, C16, C17 and C18 (in accordance with the invention) were tested in the HDS of gas oil. The regenerated catalyst C10 was also tested and serves as reference.

The characteristics of the gas oil feedstock used are as follows: density at 15° C.=0.8522 g/cm³, sulfur content=1.44% by weight.

Simulated Distillation:
IP: 155° C.
10%: 247° C.
50%: 315° C.
90%: 392° C.
FP: 444° C.

The test is carried out in an isothermal pilot reactor having a traversed fixed bed, the fluids circulating from the bottom upward.

The catalyst precursors are sulfided beforehand in situ at 350° C. in the reactor under pressure by means of the gas oil of the test to which 2% by weight of dimethyl disulfide is added.

The hydrodesulfurization tests were carried out under the following operating conditions: a total pressure of 7 MPa, a catalyst volume of 30 cm³, a temperature of 330° C. to 360° C., with a hydrogen flow rate of 24 l/h and with a feedstock flow rate of 60 cm³/h.

The catalytic performance qualities of the catalysts tested are given in table 2. They are expressed in degrees Celsius with respect to the regenerated catalyst C10 chosen as reference: they correspond to the temperature difference to be applied in order to achieve 50 ppm of sulfur in the effluent. A negative value means that the target for sulfur content is achieved for a lower temperature and that there is thus a gain in activity.

The use of acid alone or the combination of phosphoric acid with an organic acid with a $pKa_1<1.5$ is less effective than the joint use of phosphoric acid with an organic acid with a $pKa_1>1.5$.

TABLE 2

| Catalyst | Catalyst | pKa1 organic acid | P added/Mo present | Acid added/Mo present | delta T ° C./regenerated |
|---|---|---|---|---|---|
| Reference C10 | Regenerated | — | — | — | 0 |
| Comparative C11 | $H_3PO_4$ alone | — | 0.25 | — | −3.5 |
| Comparative C12 | $H_3PO_4$ alone | — | 0.75 | | −4.7 |
| Comparative C13 | Citric acid alone | 3.1 | — | 0.5 | −7.5 |
| Comparative C14 | $H_3PO_4$ + oxalic acid | 1.3 | 0.25 | 0.5 | −2.9 |
| Invention C15 | $H_3PO_4$ + citric acid | 3.1 | 0.25 | 0.5 | −8.1 |
| Invention C16 | $H_3PO_4$ + gluconic acid | 3.9 | 0.25 | 0.5 | −8.3 |
| Invention C17 | $H_3PO_4$ + γ-ketovaleric acid | 4.6 | 0.25 | 0.5 | −8.5 |
| Invention C18 | $H_3PO_4$ + gluconic acid + CoO + $MoO_3$ | 3.9 | 0.25 | 0.5 | −9.5 |

The invention claimed is:

1. A process for the rejuvenation of an at least partially spent catalyst resulting from a hydrotreating and/or hydrocracking process, said at least partially spent catalyst resulting from a fresh catalyst comprising at least one metal from group VIII, at least one metal from group VIb, an oxide support, and optionally phosphorus, said process comprising
    a) regenerating the at least partially spent catalyst in an oxygen-containing gas stream at a temperature of between 300° C. and 550° C., so as to obtain a regenerated catalyst,
    b) bringing said regenerated catalyst into contact with an aqueous impregnation solution, which contains only water, phosphoric acid and an organic acid, wherein phosphoric acid and the organic acid each have an acidity constant pKa greater than 1.5,
    c) then drying said regenerated catalyst in a drying stage at a temperature of less than 200° C., without subsequently calcining said regenerated catalyst, so as to obtain a rejuvenated catalyst.

2. The process as claimed in claim 1, wherein the organic acid is chosen from acetic acid, maleic acid, malic acid, malonic acid, gluconic acid, tartaric acid, citric acid, γ-ketovaleric acid, lactic acid, pyruvic acid, ascorbic acid, and succinic acid.

3. The process as claimed in claim 1, wherein the organic acid is an organic acid having each an acidity constant pKa greater than 3.5.

4. The process as claimed in claim 1, wherein the organic acid added per metal/metals from group VIb present in the regenerated catalyst molar ratio is between 0.01 and 5 mol/mol.

5. The process as claimed in claim 1, wherein in b) the phosphorus added per metal from group VIb already present in the regenerated catalyst molar ratio is between 0.01 and 5 mol/mol.

6. The process as claimed in claim 1, wherein the fresh catalyst has a content of metal from group VIb of between 1% and 40% by weight of oxide of said metal from group VIb, with respect to the weight of the catalyst, and a total content of metal from group VIII of between 1% and 10% by weight of oxide of said metal from group VIII, with respect to the weight of the catalyst.

7. The process as claimed in claim 1, wherein the fresh catalyst contains phosphorus, the total content of phosphorus being between 0.1% and 20% by weight, expressed as $P_2O_5$, with respect to the total weight of the catalyst.

8. The process as claimed in claim 1, wherein the oxide support of the rejuvenated catalyst is chosen from aluminas, silica, silica-aluminas or titanium or magnesium oxides, used alone or as a mixture with alumina or silica-alumina.

9. The process as claimed in claim 1, wherein a) is preceded by a deoiling stage which comprises bringing an at least partially spent catalyst resulting from a hydrotreating and/or hydrocracking process into contact with a stream of inert gas at a temperature of between 300° C. and 400° C.

10. The process as claimed in claim 1, in which the rejuvenated catalyst is subjected to a sulfidation stage after c).

11. A process for hydrotreating and/or hydrocracking of hydrocarbon cuts, comprising subjecting said hydrocarbon cuts to hydrotreating and/or hydrocracking in the presence of a catalyst obtained according to the process of claim 1.

12. The process as claimed in claim 1, wherein the fresh catalyst has a content of metal from group VIb of between 1% and 35% by weight of oxide of said metal from group VIb, with respect to the weight of the catalyst, and a total content of metal from group VIII of between 1.5% and 9% by weight of oxide of said metal from group VIII, with respect to the weight of the catalyst.

13. The as claimed in claim 1, wherein the fresh catalyst a molar ratio of the metal from group VIII to metal from group VIb of between 0.1 and 0.8.

14. The process as claimed in claim 1, wherein the regenerated catalyst has a specific surface of between 5 and 400 m²/g, and a pore volume of between 0.1 cm3/g and 1.5 cm3/g.

15. The process as claimed in claim 1, wherein c) is carried out at a temperature of between 50° C. and 180° C.

16. The process as claimed in claim 1, wherein c) is carried out for a duration of between 5 minutes and 4 hours.

17. The process as claimed in claim 1, wherein the total content of phosphorus in the rejuvenated catalyst is generally between 0.3% and 25% by weight of $P_2O_5$, with respect to the total weight of catalyst.

\* \* \* \* \*